(12) United States Patent
Khan et al.

(10) Patent No.: US 6,438,575 B1
(45) Date of Patent: Aug. 20, 2002

(54) SYSTEM, METHOD, AND ARTICLE OF MANUFACTURE FOR WIRELESS ENABLEMENT OF THE WORLD WIDE WEB USING A WIRELESS GATEWAY

(75) Inventors: Umair A. Khan; Wasiq Bokhari, both of Fremont, CA (US); Quinton Zondervan, Boston, MA (US)

(73) Assignee: Clickmarks, Inc., Fremont, CA (US)

( * ) Notice: Subject to any disclaimer, the term of this patent is extended or adjusted under 35 U.S.C. 154(b) by 4 days.

(21) Appl. No.: 09/595,781

(22) Filed: Jun. 16, 2000

Related U.S. Application Data

(60) Provisional application No. 60/210,160, filed on Jun. 7, 2000, and provisional application No. 60/209,873, filed on Jun. 7, 2000.

(51) Int. Cl.[7] ............................................... G06F 15/16
(52) U.S. Cl. ...................... 709/200; 709/203; 709/217; 709/219
(58) Field of Search ................................. 709/217, 200, 709/203, 219, 228; 370/410, 400, 313; 701/213, 201, 211; 704/270, 260

(56) References Cited

U.S. PATENT DOCUMENTS

| 6,052,120 | A | | 4/2000 | Nahi et al. ................... 345/326 |
|---|---|---|---|---|
| 6,055,229 | A | * | 4/2000 | Dorenbosch et al. ........ 370/313 |
| 6,084,584 | A | | 7/2000 | Nahi et al. ................... 345/329 |
| 6,166,734 | A | | 12/2000 | Nahi et al. ................... 345/335 |
| 6,208,659 | B1 | * | 3/2001 | Govindarajan et al. ..... 370/410 |
| 6,233,608 | B1 | * | 5/2001 | Laursen et al. ............. 709/217 |
| 6,266,615 | B1 | * | 7/2001 | Jin ............................. 701/213 |
| 6,269,336 | B1 | * | 7/2001 | Ladd et al. .................. 704/270 |
| 6,272,545 | B1 | * | 8/2001 | Flanagin et al. ............ 709/228 |

* cited by examiner

*Primary Examiner*—Ayaz Sheikh
*Assistant Examiner*—Oanh L. Duong
(74) *Attorney, Agent, or Firm*—Silicon Valley IP Group, LLC; Dominc M. Kotab

(57) ABSTRACT

A system, method and article of manufacture are provided for selection and formatting of web content for remote viewing. User-defined information is received and used to retrieve content from one or more web sites. The retrieved content is aggregated at a network server located remotely from the user. The aggregated content is formatted at the network server for display on a wireless device. The formatted content is transmitted to a wireless device for display on the wireless device.

20 Claims, 9 Drawing Sheets

SYSTEM, METHOD, AND ARTICLE OF MANUFACTURE FOR WIRELESS ENABLEMENT OF THE WORLD WIDE WEB USING A WIRELESS GATEWAY

RELATED APPLICATIONS

This application claims priority from Provisional U.S. Patent Application 60/210,160 entitled System, Method, and Article of Manufacture for Multimodal Content Access and Manipulation, filed Jun. 7, 2000, and is related to Provisional U.S. Patent Application, No. 60/209,873 entitled System, Method, and Article of Manufacture for Generating a Customized Network User Interface, filed Jun. 7, 2000, both of which are incorporated herein by reference for all purposes.

FIELD OF THE INVENTION

The present invention relates to personalized data manipulation and more particularly to aggregating content and accessing the content wirelessly.

BACKGROUND OF THE INVENTION

With the advent of wireless devices, the current shift in communications is to allow wireless access to content on the Internet. Current methods of delivering web-based content to wireless devices, however, requires that each site have wireless enabled content. Accordingly, a significant engineering investment is required on a web-site by web-site basis to enable each web-site to become wireless enabled. This is the biggest bottleneck in the wireless enabling of the web.

Thus, what is needed is a way to make all content on the web, from any location in the world, wireless enabled by aggregating user selected content at one site and making that selected content wireless enabled. The one site thus behaves as a gateway between the wireless and wired web. Utilizing the present invention, the entire world wide web can be wireless enabled without requiring an engineering investment on a website by website basis.

SUMMARY OF THE INVENTION

Prior to this invention, a significant engineering investment was required on a web-site by web-site basis to enable each web-site to become wireless enabled. This was the biggest bottleneck in the wireless enabling of the web. By removing that bottleneck, the current invention allows any content from the web to become wireless enabled instantaneously. A user can therefore access and interact with any content from any wireless device in a fashion similar to the wired devices.

Accordingly, a system, method and article of manufacture are provided for selection and formatting of web content for remote viewing. A user is allowed to provide information that specifies general or specific content to be retrieved for online or offline viewing. For example, the user can specify, retrieval of a particular web page when the web page changes/is updated. As another example, the user can make a general request to download articles relating to a particular topic, such as stock exchange information, airline fares, etc. The user is allowed to submit the user-defined information from at least one of the wireless device and a hardwired device such as a personal computer. It should be noted that such content can be anything on or transmittable via the Internet. By way of example only, such content can be hyperlinks, images, text, tables, secure information such as account information, email, and audio and video data. The user is allowed to select; customize and/or edit the content from any device, wired or wireless.

The user-defined information is received and used to retrieve content from one or more web sites. If particular content is specified in the user-defined information, the pertinent web page is accessed and the particular content is downloaded. If content is generally requested, a search engine can be used to find the information.

The retrieved content is aggregated at a network server located remotely from the user. The network server acts as a gateway through which any content from the world wide web is collected and converted into a format amenable to the wireless device. Preferably, the aggregated content is amenable to presentation and content customization through a user interface. At the network server, the aggregated content is formatted for display on a wireless device. The wireless device can include any type of device capable of receiving information where at least one of the communication links is wireless, such as a wireless telephone, Personal Digital Assistant (PDA), handheld computer such as a handheld PC, a pager, a device connected to a wireless modem, etc. The formatting style can be specific to the wireless device used by the particular user. Preferably, the content is formatted for display on a plurality of wireless devices so that the user can use any of a plurality of wireless devices to access the information. The formatted content is transmitted to a wireless device for display on the wireless device. If the content has been formatted for a plurality of wireless devices, the wireless device sends a request for a particular type of formatting associated with that type of device. Preferably, transmission cost and reliability, as well as transmission time, are customizable and are user-customizable.

In one aspect of the present invention, a user selects which content is aggregated in real time. As an option, customization of the web-based habitat can be performed utilizing the wireless device or a computer of the user.

In another aspect of the present invention, the content is aggregated on a portal page unique to the user. The portal page displays the content that the user has specified, and can include the interface that allows the user to specify the information. This portal page is fully customizable by the user and can be accessed by any device, whether wireless or hardwired. As an option, the retrieved content can be updated after a predetermined amount of time has expired. The content would then be retrieved, formatted, and transmitted to the wireless device.

In an aspect of the present invention, the user is allowed to interact with the content. Thus, the user is not only able to receive information, but is also able to send information from the wireless device. For example, the user can be allowed to fill out forms and fields, make purchases (buying and selling), read and reply to emails, etc. using the wireless device. In yet another aspect of the present invention, an alert is sent to the wireless device upon occurrence of a prespecified condition. By way of example only, an alert can be sent at a predetermined time prior to departure of an airline flight. The alert can also be a reminder of an appointment. Further, an alert can be sent upon a stock price reaching a predetermined level or an auction price reaching a certain amount.

Prior to this invention, a significant engineering investment was required on a web-site by web-site basis to enable each web-site to become wireless enabled. This was the biggest bottleneck in the wireless enabling of the web. By removing that bottleneck, the current invention allows any content from the web to become wireless enabled instantaneously. A user can therefore access and interact with any content from any wireless device in a fashion similar to the wired devices.

BRIEF DESCRIPTION OF THE DRAWINGS

The invention will be better understood when consideration is given to the following detailed description thereof. Such description makes reference to the annexed drawings wherein.

DETAILED DESCRIPTION OF THE PREFERRED EMBODIMENTS

Figure 1:
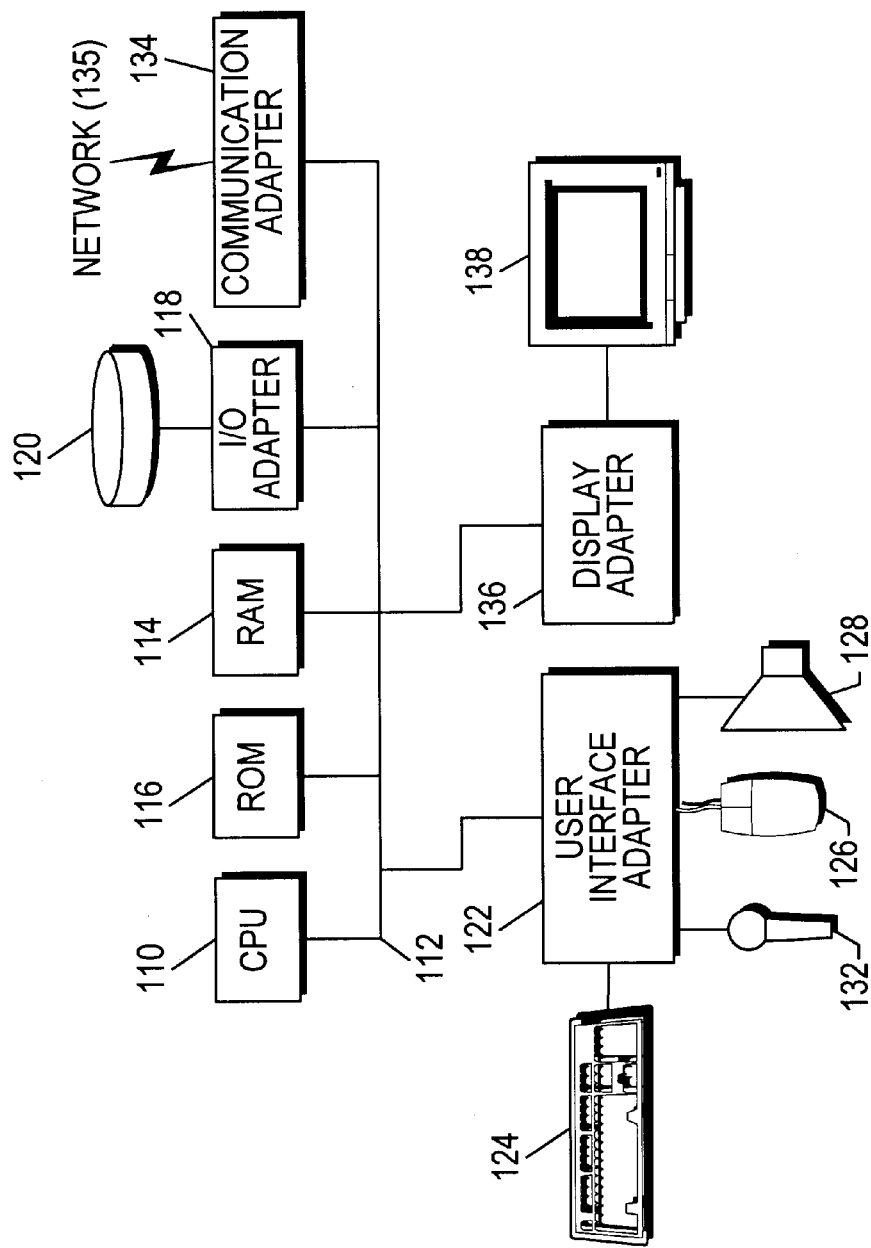
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. I includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

The present invention enables personal content management and is able to aggregate content of one's choice and have it accessible on any device. More particularly, the present invention enables wireless access of all services. Accordingly, a broad aspect of the present invention allows any user to send or receive the content of their choice from any device, in particular wireless devices including, but not limited to, Personal Digital Assistants (PDA's) and Wireless phones.

In this regard, one embodiment of the present invention includes the following parts:

1. A customizable information retrieval engine that allows users to aggregate content of their choice from any web site in existence. The content includes but is not restricted to text (i.e. news headlines, hyperlinks in web-pages), secure account information (i.e. email, bank accounts, utilities, and stock portfolios), services (i.e. maps, directions, weather, web searches), financial transactions (i.e. online shopping, buying, selling, trading, auctions, barters, comparisons) and other dynamic tasks that involve interaction of the users with other web-based (client and server side) services. The aggregated content is displayed in a customized web-based habitat, which is amenable to presentation and content customization through an intuitive interface.

2. An interface of the above mentioned web-based habitat to a wireless enabling engine that takes the content of the habitat and renders them on all devices, especially wireless devices. All the content in the custom habitat is presented in a format that is supported by the wireless devices and therefore allows any content to become wireless enabled.

The customized information retrieval engine allows the aggregation of any content into a customized web-based habitat and the wireless enabling engine takes all the content in the habitat and makes it wireless enabled. Therefore, one embodiment of the present invention allows the use of the above mentioned habitat as a conduit that allows any content on the web to become wireless enabled instantaneously.

Figure 2:
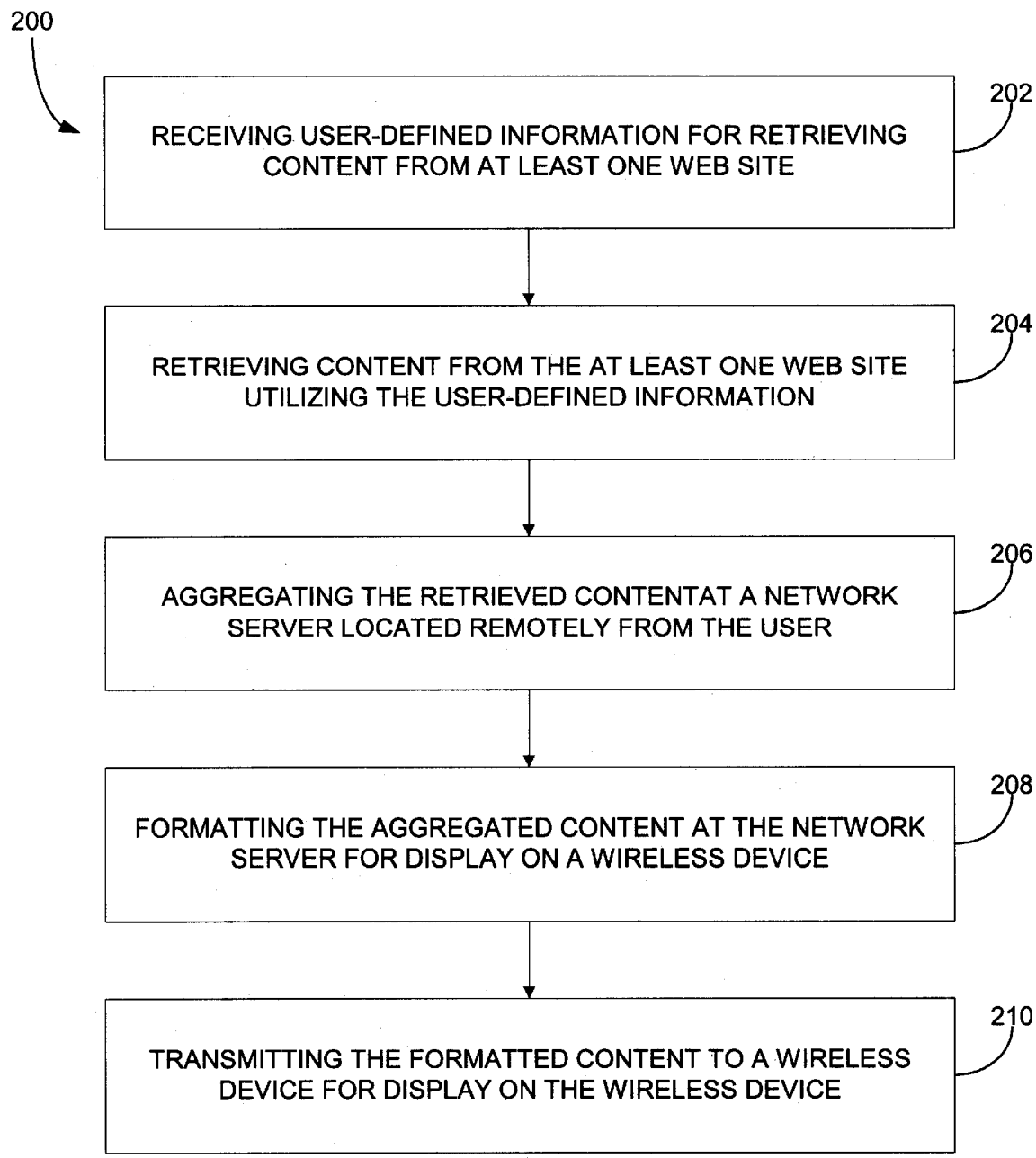
FIG. 2 illustrates a process for selection and formatting of web content for remote viewing.

FIG. 2 illustrates a process 200 for selection and formatting of web content for remote viewing. A user is allowed to provide information that specifies general or specific content to be retrieved for online or offline viewing. For example, the user can specify retrieval of a particular web page when the web page changes/is updated. As another example, the user can make a general request to download articles relating to a particular topic, such as stock exchange information, airline fares, etc. Preferably, the user is allowed to submit the user-defined information from at least one of the wireless device and a hardwired device such as a personal computer. It should be noted that such content can be anything on or transmittable via the Internet. By way of example only, such content can be hyperlinks, images, text, tables, secure information such as account information, email, and audio and video data. The user is allowed to select, customize and/or edit the content from any device, wired or wireless.

The user-defined information is received in operation 202 and in operation 204 is used to retrieve content from one or more web sites. If particular content is specified in the user-defined information, the pertinent web page is accessed and the particular content is downloaded. If content is generally requested, a search engine can be used to find the information.

The retrieved content is aggregated at a network server located remotely from the user in operation 206. The network server acts as a gateway through which any content from the world wide web is collected and converted into a format amenable to the wireless device. Preferably, the aggregated content is amenable to presentation and content customization through a user interface. In operation 208, the content is formatted at the network server for display on a wireless device. The wireless device can include any type of device capable of receiving information where at least one of the communication links is wireless, such as a wireless telephone, Personal Digital Assistant (PDA), handheld computer such as a handheld PC, a pager, a device connected to a wireless modem, etc. The formatting style can be specific to the wireless device used by the particular user. Preferably, the content is formatted for display on a plurality of wireless devices so that the user can use any of a plurality of wireless devices to access the information. In operation 210, the formatted content is transmitted to a wireless device for display on the wireless device. If the content has been formatted for a plurality of wireless devices, the wireless device sends a request for a particular type of formatting associated with that type of device. Preferably, transmission cost and reliability, as well as transmission time, are customizable and are user-customizable.

In one embodiment of the present invention, a user selects which content is aggregated in real time. As an option, customization of the web-based habitat can be performed utilizing the wireless device or a computer of the user.

In another embodiment of the present invention, the content is aggregated on a portal page unique to the user. The portal page displays the content that the user has specified, and can include the interface that allows the user to specify the information. This portal page is fully customizable by the user and can be accessed by any device, whether wireless or hardwired. As an option, the retrieved content can be updated after a predetermined amount of time has expired. The content would then be retrieved, formatted, and transmitted to the wireless device.

In an embodiment of the present invention, the user is allowed to interact with the content. Thus, the user is not only able to receive information, but is also able to send information from the wireless device. For example, the user can be allowed to fill out forms and fields, make purchases (buying and selling), read and reply to emails, etc. using the wireless device. In yet another aspect of the present invention, an alert is sent to the wireless device upon occurrence of a prespecified condition. By way of example only, an alert can be sent at a predetermined time prior to departure of an airline flight. The alert can also be a reminder of an appointment. Further, an alert can be sent upon a stock price reaching a predetermined level or an auction price reaching a certain amount.

Figure 3:
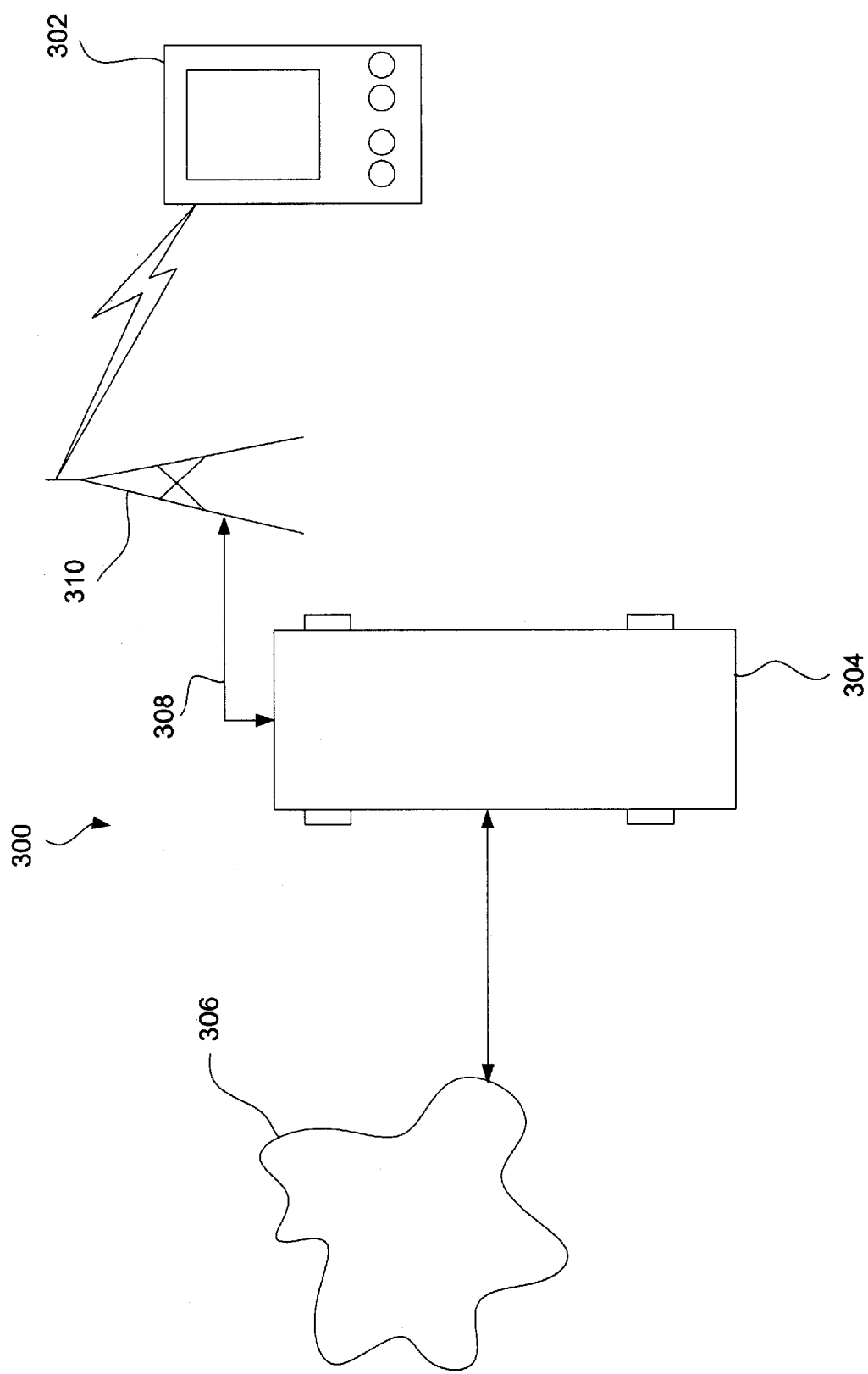
FIG. 3 depicts a preferred operating environment for one or more portable wireless devices in connection with a host computer system.

FIG. 3 depicts a preferred operating environment 300 for one or more portable wireless devices 302 in connection with a host computer system 304, where the habitat is stored and manipulated. The host computer is connected to remote sources of data information on the Internet 306.

The host computer system preferably includes a peripheral interface adapter that provides for the bi-directional transfer of the data via an interconnect line 308 to an external transceiver 310 that supports wireless communications with one or more wireless devices. The transceiver, in a simple embodiment, implements a low-power 900 Mhz or 2.4 Ghz transceiver for short-range communication with the wireless devices. In a preferred embodiment, however, the transceiver is part of a cellular or digital telephone network that allows communication between the host computer and the wireless devices at great distances, including geographically remote locations.

The wireless device is preferably constructed with a plastic case housing a display panel, a mini keyboard, a pointing device, and pointer selection buttons. The display panel is preferably an active matrix liquid crystal display (LCD) or dual-scan super-twist nematic display suitable for rendering color images at a resolution of about 640.times.480 pixels or greater. Low cost display panels with reduced resolutions and only monochrome display capabilities can also be utilized. In all events, the display panel is preferably light-weight, reasonably sturdy, and suitable for the graphic display of at least computer video data.

The mini keyboard may be of any number of conventional configurations providing for alpha-numeric keyed data entry in a relatively small two dimensional form factor. Ultimately, the mini keyboard may be replaced with a smaller number of programmable function keys that programmatically adapt as appropriate to the function of any current application displayed by the display panel. The mini keyboard may be entirely replaced with a virtual keyboard implemented by the display panel in connection with a touch screen sensor mounted in the case of the wireless device. Thus full function and specialized function data entry keys can be created as necessary or desired in support of the use of any application displayed by the display panel.

A pointing device, such as a power point tracking device or track ball can be provided to allow the wireless device to be easily held while the pointing device is manipulated. Similarly, pointer buttons are preferably configured in close proximity to the pointing device to again allow easy access and use while the wireless device is held. Preferably, pointer buttons may be programmable in defining the function performed or recognized in response to each press of the buttons.

A preferred embodiment of the present invention may also include an audio pick-up transducer and pair of speakers in support of multimedia utilization of the wireless device.

A transceiver antenna is preferably mounted within the case. Although the display panel and other electronics located within the case may be electromagnetically shielded, the cross section of such shielding should not significantly affect the efficiency of the antenna. Where the shielding presents a problem or the display table is operated near noise sources or at the near limit of the service area, the antenna may be constructed to permit external extension.

The flexibility and functionality of the wireless device may be augmented by the addition of a PCMCIA peripheral card. As conventional PCMCIA cards are removable, the function or functions that can be added to the wireless device depends on the implementation of the PCMCIA card itself. A PCMCIA card may implement a cellular phone interface would allow the wireless device to be operated at great distance from the host computer through a combination of air-links and land-lines that route to the host computer system in a conventional manner. The PCMCIA card may also implement an analog or digital modem or other high-speed serial or parallel interface that can connect either directly to the host computer when the wireless device is conveniently close to the host computer or remotely through any combination of air-links and land-lines. The PCMCIA card may also implement supplementary functions to augment the multimedia capabilities of the wireless device, other communications protocols and data connection systems, and upgrades to the basic capabilities present in the wireless device, including new encoding, encryption and compression capabilities.

A connector can provide external power access that provides operating power and, potentially, power for recharging batteries provided within the case of the wireless device. Other connectors may provide for conventional keyboard, mouse and joysticks, as external peripherals, to be fully integratable into the overall function of the display table.

While the use of small high energy density rechargeable batteries is preferred, the power consumption requirements of the wireless device can be managed closely to minimize the power load that is required to be supported in the normal operation of the wireless device. The refresh frequency and brightness of the display panel may be reduced during periods of perceived inactivity. The transmission power produced by the on board transceiver connected to the antenna may be selectively reduced to meet a minimum acceptable noise margin. This may have the additional benefit of reducing the effective size of the service area to an area specifically appropriate to the unique location of a particular wireless device, thereby reducing the possibility of signal interception and unnecessary cross-talk. Finally, subsystems such as the PCMCIA card and multimedia support circuitry providing signal and power to the speakers and transducer can be selectively powered down when their use is not needed or desired. As a result, the wireless device should have a battery life of from two to four hours.

The internal electronic control system of the wireless device is preferably constructed as a low-cost embedded microprocessor control system utilizing a main processor bus to provide a data and control interconnect between a microcontroller CPU and a main memory bank. The microcontroller can be directly implemented utilizing any of a wide number of a existing low-power, high-performance microcontrollers, such as the Intel 80C51 series, the Intel 80C196KB high performance CHMOS microcontroller, or the like.

The main memory is preferably constructed utilizing approximately two to ten megabytes of low-power dynamic RAM memory. While the wireless device will support the execution of almost any number of complex applications, the resident main memory need not be of significant size. The application programs are executed on the host computer while, in the preferred embodiment, the operation of the wireless device is strictly limited to the terminal display of graphic and related data. Thus, the main memory is preferably sized sufficient to allow execution of a control program implementing primarily the display function of the tablet independent of the actual execution of the application program. Consequently, not only is the size of the main memory both reduced and largely non-critical in relationship to the complexity and type of application programs executed by the host computer, but the microcontroller is not constrained by compatibility issues with regard to the type of CPU utilized by the host computer or the specific type and version of the operating system executed.

Some combination of non-volatile RAM and ROM memory may be provided to store at least a portion of the control program that is executed by the microcontroller. The non-volatile RAM/ROM memory preferably stores at least a portion of the control program sufficient to enable the microcontroller to download the remaining portions or full new image of a control program from the host computer. To permit future upgrades of event the permanently resident portion of the control program, non-volatile RAM memory can be utilized to allow field upgradability.

A conventional power controller provides for the regulation of power to the control system from either an external power source or the onboard battery. The power controller preferably is programmable by the microcontroller to selectively provide power to separate subsystems of the controller. The microcontroller is therefore able to effectively manage power consumption by the control system as a whole. Specifically, independent power regulation may be provided for an audio subsystem, PCMCIA interface and a short range transceiver. Power may be regulated selectively for other components of the control system where continued or excessive power consumption is unnecessary or undesirable.

A generally conventional video graphics controller is provided as the control interface for managing the operation of the display panel. The video graphics controller may internally implement a simple hardware graphics adaptor or more complex hardware graphics accelerator for enhancing the effective speed of the video graphics controller and, in general, the perceptible performance of the wireless device.

Depending on the resolution supported by the video graphics controller, including color depth, a conventional video memory array is provided as frame and scratch-pad memory for use by the video graphics controller. Generally, a minimum of 1 megabyte of video memory is sufficient to support a display panel resolution of 640.times.480 at a color depth of 8 bits. The video memory may be expandable to two, four or more megabytes of memory as appropriate to support the function of video graphics controller.

A conventional LCD driver circuit is also connected to the video graphics controller to generate the control and driver signals necessary to directly operate the display panel.

Finally, a touch screen interface may be provided to support a touch screen function in connection with the display panel. The video graphics controller may include circuitry for operating and responding to the touch screen interface as needed to digitally represent a screen touch. This information is then available for use by the microcontroller in much the same manner as any other pointing device information is made available by the microcontroller.

The audio subsystem preferably includes the conventional functionality of multimedia peripheral cards for personal computers. The preferred supported functions include digital-to-analog conversion and power amplification of stereo audio channels as appropriate to drive the speakers. The audio subsystem preferably also includes an analog-to-digital converter connected to the transducer. Additional analog or digital signal processing circuitry may be provided to reduce noise and eliminate feedback from the speakers prior to or after the analog-to-digital conversion is performed by the audio subsystem.

Finally, a PCMCIA interface provides a preferably 16-bit wide, high-speed parallel interface between the connector or connectors supported by the PCMCIA slot and the main processor bus. The PCMCIA interface itself is preferably implemented through the use of a conventional PCMCIA interface controller chip.

Any number of applications can be executed concurrently by the host computer in accordance with the normal operation of the operating system or, as in the preferred embodiment, subject to an effective partitioning of the operating system execution states to support concurrent execution of the multiple applications by an otherwise single-user operating system. In both events, the applications present calls to the operating system including, in particular, calls relating to the display and update of images on a respective display. These displays, however, are logical displays that are mapped by the operating system into a single master logical display space utilizing, as appropriate, windowing and desktop paradigms for the presentation of the composite master logical display. That is, the master logical display is drawn by the operating system by a series of appropriate low-level display driver calls to a display driver.

In the preferred embodiments of the present invention, a pseudo-display driver is provided to manage the detailed presentation of a master logical display within a window of another master logical display corresponding to another partition of the execution environment supported by the operating system. The pseudo-display driver effectively operates to intercept low-level display driver calls from any or all of the operating system execution partitions. The output of an executing partition may be directed to an independent display, such as the local video display or passed substantially unaltered to a long-range transceiver driver. In an initial implementation of the present invention, the long-range transceiver driver and the low-power transceiver is instantiated once for each wireless device supported by the host computer system. Thus, the display driver calls from a single executing partition of the operating system, or multiple partitions operating in collaboration, are passed as a driver call stream to the long-range transceiver driver for transmission to a corresponding wireless device. Outbound audio data and inbound pointer and audio data are processed through the long-range transceiver driver. Outbound audio data and inbound input and audio data may be transferred directly between the operating system and long-range transceiver driver subject to maintaining the correlation between the applications executing within the execution partition of the operating system associated with the particular instantiation of the long-range transceiver driver corresponding to that partition. Consequently, a proper association both for inbound and outbound data for specific applications is maintained through the operating system as between the host computer system and any number of wireless devices.

A preferred alternate embodiment of the present invention preferably provides for a single long-range transceiver driver that is effectively aware, as is the pseudo-display driver, of the multiple partition execution space of the operating system. This alternate long-range transceiver driver preferably supports a multi-channel spread spectrum transceiver. Display and analog output data associated with execution partitions of the operating system respectively directed for transmission to a particular wireless device to implement the low-level display driver. Consequently, the appropriate physical display, either the local video display or a wireless device is updated consistent with the ongoing execution of the corresponding operating system partition. The long-range transceiver driver may further provide for variable encryption and decryption of the low-level driver call data streams that pass through the driver. Destination signatures may also be included into the data streams to specifically identify the particular recipient host computer and wireless device that are intended to be exclusively communicating over a particular channel supported by the transceiver. This provides both security over an appropriate interception of the transmitted data as well as secure validation that data streams are being sourced and received by the intended participants.

Nominally, the client application itself is charged with the responsibility to decode, decrypt or decompress data for presentation. Various graphical images transmitted to browser applications are encoded and/or compressed using various lossee or lossless algorithms to substantially reduce the transmitted data size. In a relationship to this class of application, one embodiment of the present invention implements a processed data bypass that allows the encoded, encrypted or compressed data as received by the host computer to be transferred in an unaltered form to a wireless device. Since data transferred in an encoded, encrypted or compressed form is done subject to a public algorithm specification, no compatibility issues arise by allowing the microcontroller with implementing the unencoding, decrypting or decompression algorithm yet maximizing the effective utilization of the bandwidth connection between the wireless device and host computer system.

A complication arises particularly in Web browser applications. There, the rendered display is content dependent. Therefore, display dependencies are resolved dynamically by the application based on the final representation of any unencoded, decrypted and decompressed data. In such circumstances, the host computer system must provide for full processing of the received data in support of the otherwise ordinary operation of the application as needed to produce a finally determined impression of the information to be displayed by a wireless device. This is handled in the present invention on the host computer side through the further implementation of the host system detail. A socket driver, conventionally referred to as a WinSock driver in relationship to Microsoft operating systems, manages a network socket connection to a remote computer system that is the source of encoded, encrypted or compressed data. The WinSock driver effectively supports bi-directional data transfer between the driver and operating system in support of the pseudo-display driver and an exemplary Web browser application. The WinSock driver is typically merged with the operating system to extend the application program interface (API) that is presented to the browser application.

The WinSock driver is preferably modified to identify objects such as compressed data images from the inbound socket data stream. The object is identified by the driver not only as being subject to immediate bypass to the long-range transceiver driver, but further that the socket data stream carrying the object is destined for a particular application. Thus, the long-range transceiver driver is provided with both the bypassed data object and at least an identification of the particular wireless device that is to receive the object. The data object as passed to the long-range transceiver driver and, in parallel, to the operating system with a unique identification tag generated by the WinSock driver. This tag is associated with the data object in the socket data stream ultimately for use by the pseudo-display driver. Preferably, the data object tag and the communication of the tag to the pseudo-display driver is provided logically separate from the socket data stream that is provided through the operating system to the browser application. Consequently, an entirely conventional browser application may be utilized in connection with the present invention without loss of performance or compatibility. Data objects received by the browser application are therefore conventionally unencoded, decrypted, and decompressed and used if and as necessary to resolve dependencies on, for example, the size and location of a graphic image in relationship to text within the browser applications current logical display. That is, the browser application processes the received socket data stream and produces a series of operating system calls to define the appearance of theological display window controlled by the browser application.

Operating system display calls are further reduced by the operating system to low-level display driver calls that are passed to the pseudo display driver. Based on an examination of the various data objects identified to the pseudo-display driver in connection with the low-level display driver calls, respective unique identifying data object tags are identified by the pseudo-display drive. Each tag, as identified, is used to replace the unencoded, decrypted or decompressed representation of the corresponding data object. Thus, only display driver calls referencing data object tags and untagged data are processed through the pseudo-display driver to the long-range transceiver driver for transmission to a wireless device.

In the preferred embodiment of the present invention, the long-range transceiver driver operates to transmit fixed block size data packets that together convey messages to a wireless device. A message can be a data object received from the WinSock driver. Other messages include a low-level device driver call and as appropriate for the call, a display object tag or an untagged data object as received from the pseudo display driver. A tagged data object identified and provided from the WinSock driver will therefore be at least queued for transmission to a corresponding wireless device prior to a display object tag being provided by the pseudo display driver to the long-range transceiver driver for transmission to the same wireless device. Furthermore, the latency between the transmission of the data object itself and transmission of the tag allows a quite adequate amount of time for the microcontroller to receive and, as appropriate, process the data object into an unencoded, decrypted or decompressed form. The actual latency incurred at different times will be determined by operating system and browser application, executed and latencies that control the generation of display driver calls by the operating system to the pseudo display driver to pass a data object tag to the long-range transceiver driver.

Figure 4:
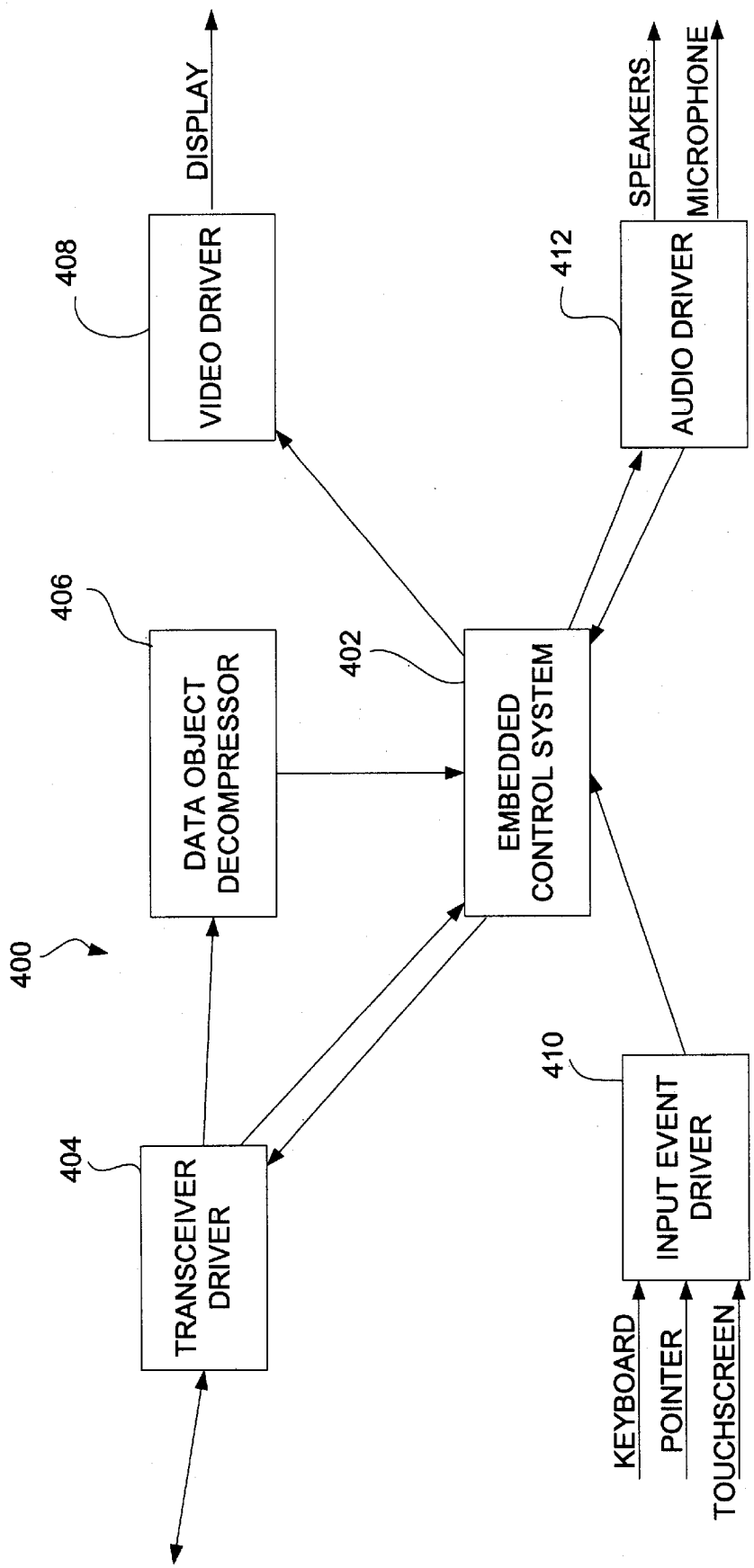
FIG. 4 illustrates a top level software detail of the control program is shown in accordance with a preferred embodiment of a wireless device.

Referring now to FIG. 4, a top level software detail 400 of the control program is shown in accordance with a preferred embodiment of a wireless device. An embedded control system 402 is the central component of the control program. Preferably, the embedded control system implements an interrupt-driven, light weight threaded core that efficiently supports operation of a long-range transceiver driver 404, a data object decompressor 406, a video driver 408, an input event driver 410, and an audio driver 412. Multiple threads are implemented by the embedded control system primarily in support of overlapping and out-of-order data transfers with respect to the long-range transceiver driver. The long-range transceiver on the wireless device supports a single active transceiver data channel. The tag provided with or in place of a data object includes an identification of the particular application data stream associated with the object. The embedded control system allocates a separate thread for handling each uniquely identified application data stream and thereby conveniently managing overlapping and out-of-order data transmissions. While a non-threaded core could be utilized, the use of a conventional multi-threaded core within the control system is preferred as providing a more convenient transactional platform for supporting multiple application data streams.

Tagged data objects received by the long-range transceiver driver are transferred to the video image decompressor. A number of different algorithms may be implemented by the video image decompressor to be selectably used as appropriate for the particular nature of the data object passed from the long-range transceiver driver. In many instances the data object will be a graphics image presented in any of a number of compressed forms. Typically, the compressed data object itself identifies the type and version of the algorithm necessary to decompress the data object. The object is decompressed and the resulting video image and unique object identification tag are cached by the embedded control system for subsequent use.

Untagged data objects and bare data object identification tags are passed directly from the long-range transceiver driver to the embedded control system for evaluation. Decompressed graphics images are substituted for their corresponding unique identifying object tags and an ordered set of low-level drawing commands and data effectively corresponding to the received data stream is then provided to the video driver. In turn, the low-level display driver commands and data are interpreted and executed by the video driver to directly provide for the presentation of a corresponding image by the display panel.

The data stream received by the long-range transceiver driver may also include low-level commands, data and potentially unique object tags that are to be directed to the audio driver. The commands and data directed to the video driver and audio driver are independently routed by the embedded control system to the appropriate driver. Where the application data stream includes audio driver commands that reference a unique object identification tag, the embedded control system again searches the local object cache for a corresponding expanded object. As with graphic data objects, compressed audio data objects also encode an identification of the decompression or decoding algorithm necessary to process the data object. Thus, the object decompressor processes the compressed audio data object utilizing the appropriate algorithm. The audio commands, untagged data objects and substituted decompressed data objects are then provided to the audio driver for execution and presentation by the speakers.

The audio driver also produces an inbound application data stream from the audio transducer, when enabled. A resulting digital data stream is passed from the audio driver to the embedded control system for return within a message of an appropriate application data stream through the long-range transceiver driver to the host computer. The appropriate application data stream is identified potentially from the application data stream that last previously enabled operation of the transducer through the audio driver. The digitized audio data gathered by the audio driver may be passed directly through to the long-range transceiver driver for transmission. Alternatively, the embedded control system may direct the digital audio stream through the object decompressor to perform audio compression prior to transmission. By compressing this audio data prior to transmission, a substantial portion of the bandwidth available to the long-range transceiver is preserved while introducing minimal latency due to the operation of the compression algorithm.

The input event driver receives, manages and provides keyboard, pointer and touch screen input data to the embedded control system. This input data is directed by the embedded control system to the long-range transceiver driver for transmission in the form of call messages to the host computer system. However, such input data is not immediately associated with a particular application data stream by the embedded control system. Rather, the input data is identified only generically by type of information prior to transmission. In accordance with the preferred embodiments of the present invention, the operating system appropriately determines the particular application that is currently set to receive input from the keyboard, printer and touch screen. In certain circumstances, this may be the operating system itself and in other circumstances, the currently active application execution partition of the operating system. Consequently, the control program operates to effectively support any number of applications being executed on the computer system implicitly by the identification of their respective application data streams as received by the long-range transceiver driver. The embedded control system is also capable of associating inputs specifically with the transceiver data streams as appropriate to maintain the integrity of each individual application execution partition of the operating system.

In the control and data flow relationships between the host computer system and a wireless device, the network operating system component of the operating system executed by the host computer system implements a TCP/IP or similar network communications protocol. A socket intercept module is provided in accordance with the present invention to filter, identify and bypass compressed data objects subject to predefined conditions to a wireless transceiver subsystem.

The predefined conditions include the specific data object compression forms that can be handled by a particular model of a wireless device and that a wireless connection has been established with a valid wireless device. All of the data received by the socket intercept module is identified by the number of the particular socket connection that receives the data. All conventionally valid data received by the socket intercept module is provided to the application that owns the corresponding socket connection as determined and defined through the core operating system, including the graphical user interface (GUI) module. An input event multiplexer module, established in accordance with the present invention, receives input event data and associates the events with a corresponding execution partition through the core operating system.

The application executing within a partition of the core operating system may maintain a private data space. Where the application is a browser, a browser image cache is supported to hold decompressed image data that can be repeatedly referenced on repeated application access requests for the corresponding compressed data object.

Independent of whether a compressed data object is requested from and immediately received through the socket intercept module or from a browser image cache, particularly as determined by the browser application itself, the core operating system issues low-level graphics calls and accompanying data through a graphics calls intercept module. Where the local display of the host computer system is controlled by an application within the current execution partition of the operating system kernel, the display graphics calls and object data are passed as received to the software display driver for final processing against the display hardware.

The unique identifying tag assigned to a data object by the socket intercept module is identified by the graphics calls intercept module. The identifying tag is then substituted for the actual data object within the application data stream of low-level graphics calls and data. The resulting modified data stream is then directed to the wireless transceiver subsystem.

Similarly, the operating system kernel directs low-level audio calls and data to an audio calls intercept module. Any tagged data objects, as previously identified by the socket intercept module, are held in a dedicated cache by the operating system kernel. When a tagged data object is cached, the tag is provided to the audio calls intercept module. The low-level audio calls and data may be passed locally to the software audio driver for final processing by the audio hardware. The low-level audio calls, with all tagged data objects substituted by their tags, may be separately or collaboratively transferred to the wireless transceiver subsystem.

The wireless transceiver subsystem receives an assigned channel of data. The channel data is provided to a multi-threaded socket data handler that operates to segregate the channel data into separate threads corresponding implicitly to the separate socket data threads as then identified by the socket intercept module. The decompressor cache manager effectively multiplexes between the different data threads to identify compressed data objects. As each compressed data object is encountered, the decompressor cache manager appropriately decompresses the data object and stores the decompressed object in an object cache as established in the main memory by operation of the control program. If the object cache fills, given the finite amount of main memory allocable as the cache, the decompressor cache manager sends an invalidating message to the wireless transceiver subsystem with an identification of the image tag of the least recently used object in the object cache that is being invalidated. This message is returned to the graphics calls intercept module that manages a list of all valid tagged objects within the object cache. Thus, whenever the application and GUI code module directs the transfer of an untagged data object, a tagged compressed data object can be quickly formed from the data provided by the application and GUI code module and forwarded through the wireless transceiver subsystem.

When the thread handler provides a tagged data object reference to the decompressor cache manager, a list of valid tags maintained by the cache manager is checked to select a corresponding data object from the object cache for transfer to the display control system. These data objects, in connection with the graphics call stream passed through the wireless transceiver subsystem are then utilized by the display control system to compose a composite display image that is presented on the panel by the display hardware.

Audio sound clips are handled through the decompressor cache manager in a manner generally similar to graphics data objects. The socket intercept module identifies audio clips within the network channel data stream as another specific form of compressed data object. The compressed audio data object is bypassed immediately to the wireless transceiver subsystem while, at the same time, being passed to the application core operating system module. The audio calls intercept module maintains a list of the data object tags associated with bypassed compressed audio data objects. As references to tagged data objects are received by the audio calls intercept module, tag substitution is again performed prior to the audio low-level call being forwarded to the wireless transceiver subsystem.

The threaded socket data handler receives and distinguishes a message as containing an audio call and a compressed audio data object. The threaded socket data handler 168 passes the object to an appropriate multiplexer channel of the decompressor cache manager for storage in the object cache as any other data object. However, unlike graphics data objects processed through the decompressor cache manager, compressed audio data objects may be stored directly in the object cache where the necessary decompression routine for the audio data is supported directly in the hardware of the audio output module. Alternately, the decompressor cache manager may operate stream decompress and pass the audio data object to the audio output module without storing the object in the object cache. The decompressor cache manager may alternately perform a preprocessing function on compressed audio data objects to transform the compression representation of the object or partially decompress the object to a point where dedicated hardware provided in the audio output module can complete any required further decoding and decompressing as the audio data object is streamed to the audio hardware.

The audio hardware includes the transducer of the wireless device. Inbound audio is routed by the audio hardware to the audio output module. In a preferred embodiment of the present invention, the audio output module compresses and encodes the inbound audio stream to the extent supported by the hardware of the audio output module. The stream of audio data objects produced from the audio output module are passed to the wireless transceiver subsystem for transmission through the wireless subsystem. These inbound audio data objects are then passed to the audio calls intercept module for selective reintegration into an appropriate application execution partition of the core operating system module. Consequently, the executing application expecting audio input from the audio hardware receives the audio data object stream as though acquired through the software audio driver and audio hardware.

Finally, an input event module receives and processes keyboard, pointer and touch screen input information into a corresponding set of inbound input event messages that are forwarded ultimately to the input event multiplexer module. The received input events are matched through the input event multiplexer module to the appropriate application execution partition of the core operating system module. Thus again, the partition executing application receives the input events as though locally generated by the host computer system itself.

Figure 5:
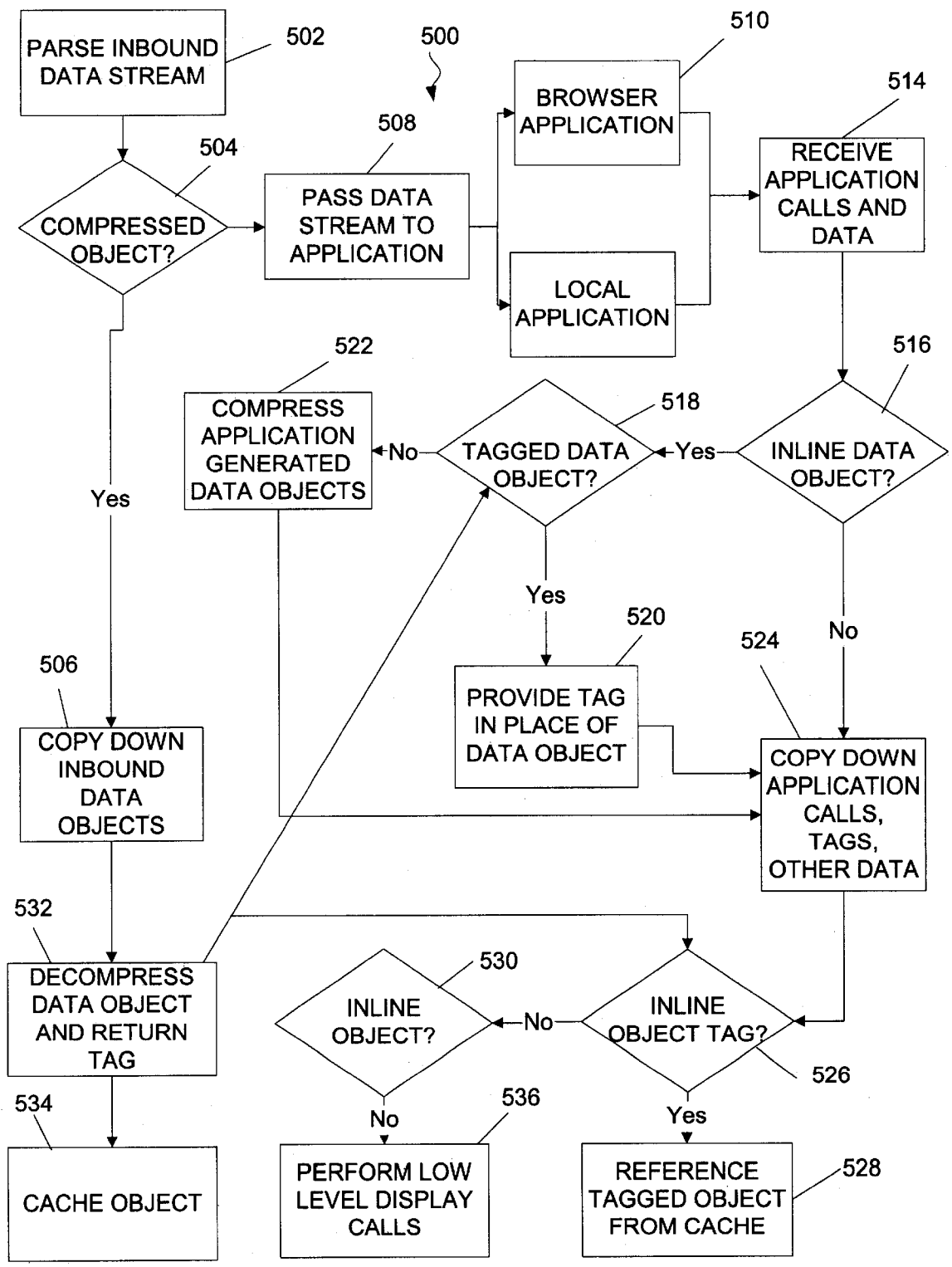
FIG. 5 depicts a combined data flow detailing the handling of compressed data objects.

A combined data flow 500 further detailing the handling of compressed data objects is shown in FIG. 5. As shown, the flow handles both network received and locally or host generated compressed data objects. Network originated compressed data objects are parsed from the inbound network data steam in operation 502. As individual objects are identified and determined to be of a compressed form that can be handled directly by the control program, the compressed data objects are routed in operation 504 for copy down 506 directly to the control program.

The inbound network data stream is processed generally by the operating system of the host computer and passed in operation 508, as appropriate, to applications 510, 512 executing on the host computer system. In the case of a browser application, or the like, compressed data objects are frequently requested and received from the inbound data stream. Conversely, a local application may not receive any externally originated compressed data objects that can be directly handled by the control program. Indeed, the local application need not receive any data from the network data stream. In any event, the browser application and local application may manipulate any received data objects, including decompressing and decoding the objects. Both the browser and local applications may function to generate new data objects.

Both the browser application and local application ultimately issue calls to the operating system executing on the host computer. These calls and accompanying or referenced data objects are received by the operating system in operation 514. A series of low-level calls and data objects responsively generated by the operating system is then passed to the pseudo-display driver, for example. The series of calls and objects are processed to particularly distinguish data objects and call commands in operation 516.

Data objects are examined in operation 518 to distinguish between tagged and untagged data objects. At a minimum, tagged data objects can be identified by comparing at least a signature of the data object to a local list of known tagged data objects maintained by the pseudo-display driver. Where a signature match is found, the corresponding tag is provided in place of the data object in operation 520. The data object tag is then prepared as part of a message for copy-down to the control program.

Where a data object fails to match a known tagged object signature, the data object is assumed to have been created locally by the applications. Such local data objects are first compressed in operation 522 and prepared in operation 524 for copy-down to the control program.

As each message is prepared for copy-down individual messages are identified by thread and multiplexed for transmission to the wireless transceiver subsystem.

Once received by the control program, a message is examined in operation 526 to determine whether the message includes a data object tag. A control program local list of known object tags is scanned to determine if a corresponding pre-decompressed data object is present in the object cache. When a matching data object tag is found, the tag is replaced in operation 528 with a pointer to the corresponding pre-decompressed data object stored in the object cache. Preferably, the data object is identified by reference thereby reducing memory-to-memory data copies of the tagged data objects. A message is then further examined in operation 530 for the existence of compressed inline data objects. Each identified inline data object is then decompressed in operation 532. The inline data object may then be selectively provided with a local data object tag generated by the control program. By default, inline data objects that are greater than an empirically selected default size of five kilobytes are tagged by the control program. A flag provided as part of a message including a data object may be used to explicitly determine whether the inline data object is to be tagged or not by the control program. The data object, regardless of whether tagged or not is then cached in the object cache in operation 534. Untagged data objects will have the lowest priority for remaining in the cache. Where a tag is generated by the control program, a copy of the new data object tag is added to the local lists of known data object tags that are utilized in identifying tagged data objects on both the host computer system and wireless device. These lists are updated as appropriate whenever tagged data objects are newly cached or expired from the cache immediately or by cache flush. The host list is preferably updated with respect to control program generated tags based on a memory management model executed as part of the pseudo display driver. Alternately whenever the control program updates its tag list, a message directing a corresponding update to the tag list maintained on the host computer system can be generated and returned by the control program.

Finally, a reference to the cached data object is placed into the stream of application calls within the message. The calls and referenced data objects are then implemented in operation 536 by forwarding to the display control system module. Display calls that reference cached data objects operate to copy at least selected portions of the data objects to the memory as appropriate to carry out the application call. Consequently, the density of data objects transmitted to the wireless device is maximized for both network and local host generated data while minimizing the display latency impact due to the limited available transmission data bandwidth between the host computer system and wireless device.

The present invention allows a user to create an information portal whose source and content is completely customizable. Information on the web exists in the form of hyperlinks that appear in different web sites. A news site for example may contain headlines that are hyperlinks to their detailed exposition. In typical portals, the user chooses from a pre-determined set of headlines collected from a pre-determined set of web-sites. The user has no control over either the web-sites he/she gets the content from or the headlines that are taken from those web-sites. The present invention allows the user to completely configure both the source and content that he/she wants on his/her own portal.

Figure 6:
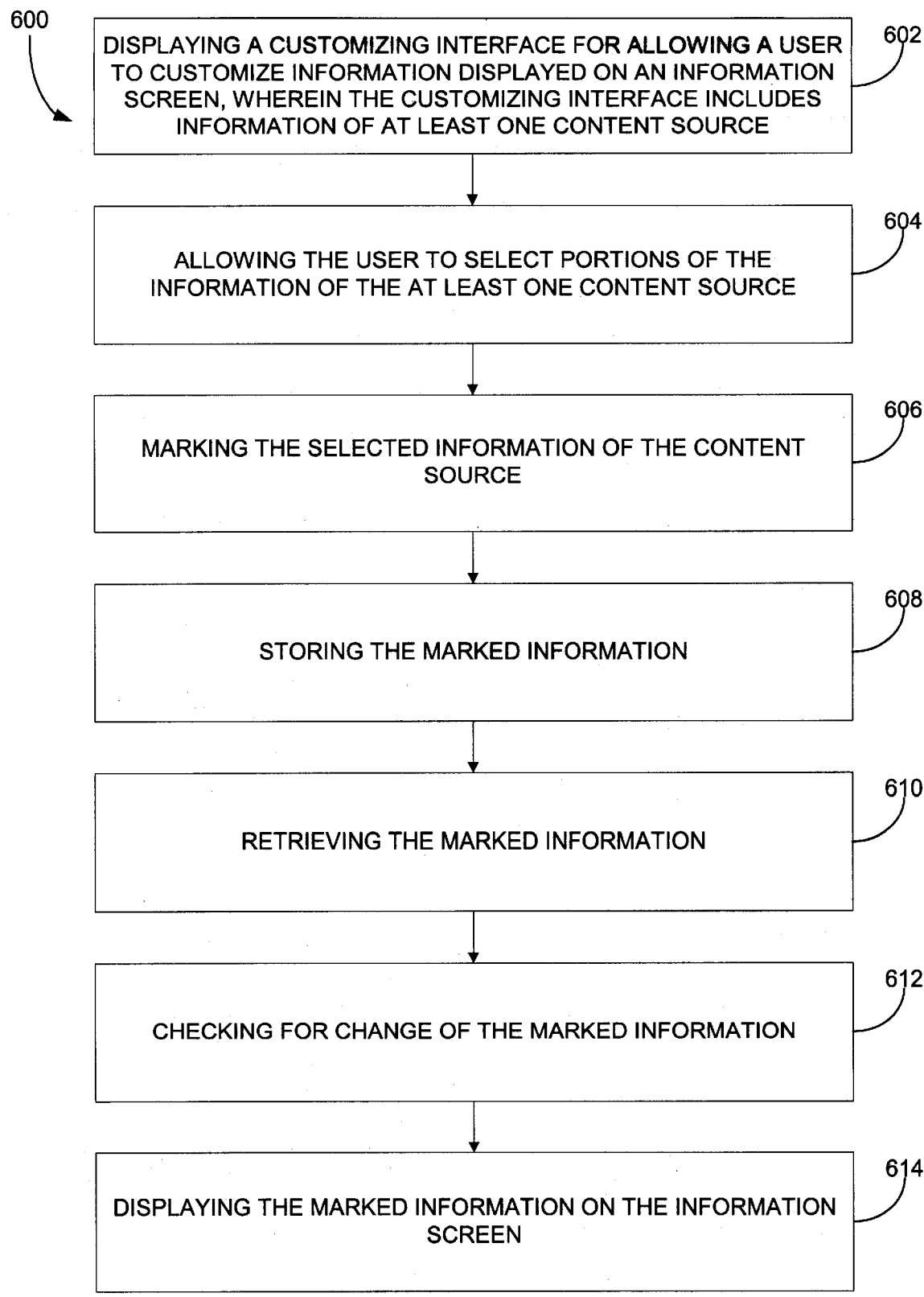
FIG. 6 illustrates a process for generating a customized network user interface according to one embodiment of the present invention.

FIG. 6 illustrates a process 600 for generating a customized network user interface according to one embodiment of the present invention. A management interface is provided in operation 602. The management interface allows a user to select and manage information that is displayed on an information screen and viewed by the user. The management interface includes information of at least one content source which can be selected. It should be noted that such information can include such things as portions of web pages, links to web pages, or any other type of information. Such a content source can be a web page or any other content source. In operation 604, the user is further allowed to select portions of the information of one or more of the content sources. The selected information of the content source may then be marked in operation 606. In operation 608, such marked information is stored for subsequent retrieval in operation 610. Various changes in the marked information may be checked in operation 612, and in operation 614, the marked information may then be displayed on the information screen.

In one embodiment of the present invention, the information screen may include a plurality of different views. Each view may contain at least one window for displaying the marked information. Further, the user may be allowed to select, maximize, minimize, refresh and edit the content of the window.

In another embodiment of the present invention, the user may be allowed to share the views with other users such as via electronic mail or by permitting access to the views. As an option, the marked information may be presented on the information screen over a configurable number of days in the past. Further, the user may be allowed to drag and drop the information from the customizing interface to the information screen. The information may also be marked upon dropping the information in the information screen.

In still yet another embodiment, the step of marking the selected information may include determining an address of the selected information and a table, row, column, and/or cell of the selected information. Further, the step of checking for change of the marked information may include the steps of determining whether the content of the marked information has changed and determining whether the format of the marked information has changed. As yet another option, the step of checking for change of the marked information may be performed at predetermined intervals.

According to a preferred embodiment of the present invention, the user is presented with a page that contains the user's information of choice from an arbitrary number of different sources and presented in a completely customizable format. The page consists of different "views" where each view in turn contains multiple windows. The number of views and the number of windows in each view can be configured.

Each particular window contains hyperlinks that have been selected by the user from web-sites of his/her choice. A window may for instance be dedicated for international news and could contain hyperlinks selected by the user from any number of web-sites of his/her choice. The user has complete freedom in selecting the source of his/her content (i.e. the web-site) and the content from that source (i.e. the hyperlinks).

Figure 7:
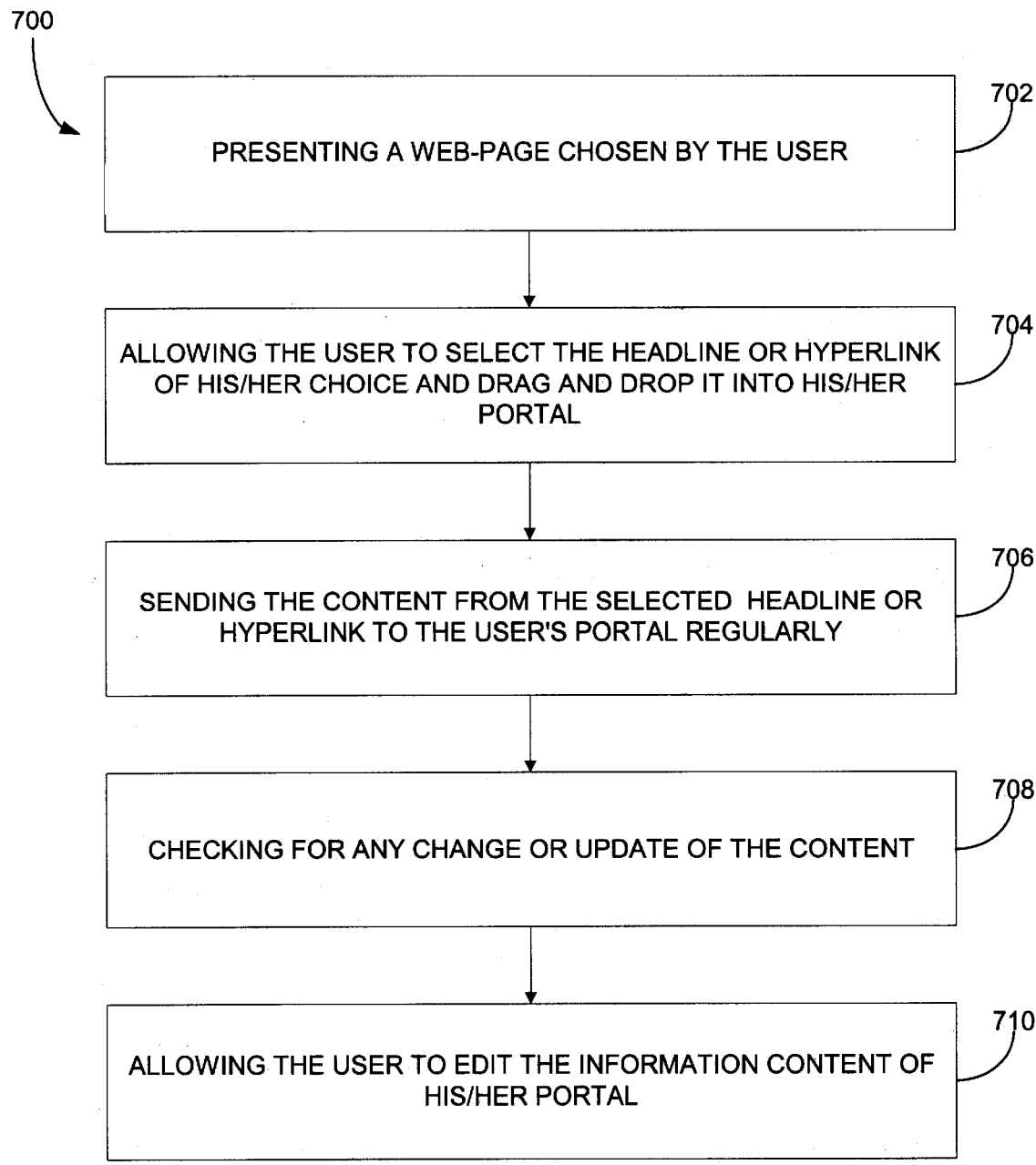
FIG. 7 is a flowchart of a process for allowing a user to customize an information portal according to one embodiment of the present invention.

FIG. 7 is a flowchart of a process 700 for allowing a user to customize an information portal according to one embodiment of the present invention. When the user wishes to add content, a web-page chosen by the user is presented in operation 702. In operation 704, the user is then allowed to select the headline or hyperlink of his/her choice and simply drags and drops it into his/her portal. From that point on, in operation 706, the content from that headline or hyperlink will be brought to the user's portal regularly. In operation 708, a check for any change or update of the content is made. If the content changes or is refreshed, the new content will be brought to the user. In operation 710, the user is further allowed to edit the content of his/her portal at will by adding or deleting headlines, moving them from one window to another within a view or moving them to other windows in different views.

Another embodiment of the present invention includes the following parts: (a) An interface that displays the user customized information, (b) an interface that allows the user to select and manage the information of choice, (c) a mechanism for marking selected information contained in a web-page (d) a method for communicating that information to the backend servers that process and store that information, (e) a mechanism for the storage of the selected information (f) a mechanism for regularly retrieving selected information and (g) a mechanism for checking for change in the content or the format of the selected sources of information.

The User Interface to Display Preferred Content

The user interface comprises "views", each of which contain multiple windows. The number of windows in a view is completely configurable. The user may create or delete as many views as he/she may desire. This user interface allows a user to cleanly categorize related information within individual windows and views. This provides a user one place to access all of his/her favorite information and content from the web. This content includes (but is not limited to) (a) News and Information headlines (of all sorts) (b) Information about email, bank and other accounts (c) Information about shopping and comparison of rates and prices (d) Graphs, Images, Sounds or any other media.

This content is presented to the user with an ability to edit and manage it intuitively and interactively. Some of the features of the management process include (a) a presentation of the user's selected information over a configurable number of days in the past (b) an ability to select, maximize, minimize, refresh or edit the content of individual windows (c) to "publish" user's views into a directory of views and (d) to share these views with other people by emailing them the views.

The Interface for Selection and Management of Preferred Content

The interface that allows the user to create his/her customized portal is based on an intuitive drag and drop capability. The user simply selects the sources or headlines of choice and drags and drops them into windows and views of choice. The drag and drop feature also makes customization very easy for the user, allowing quick compilation and management of their preferred content. There are two levels of selection and management provided, default and advanced.

Figure 8:
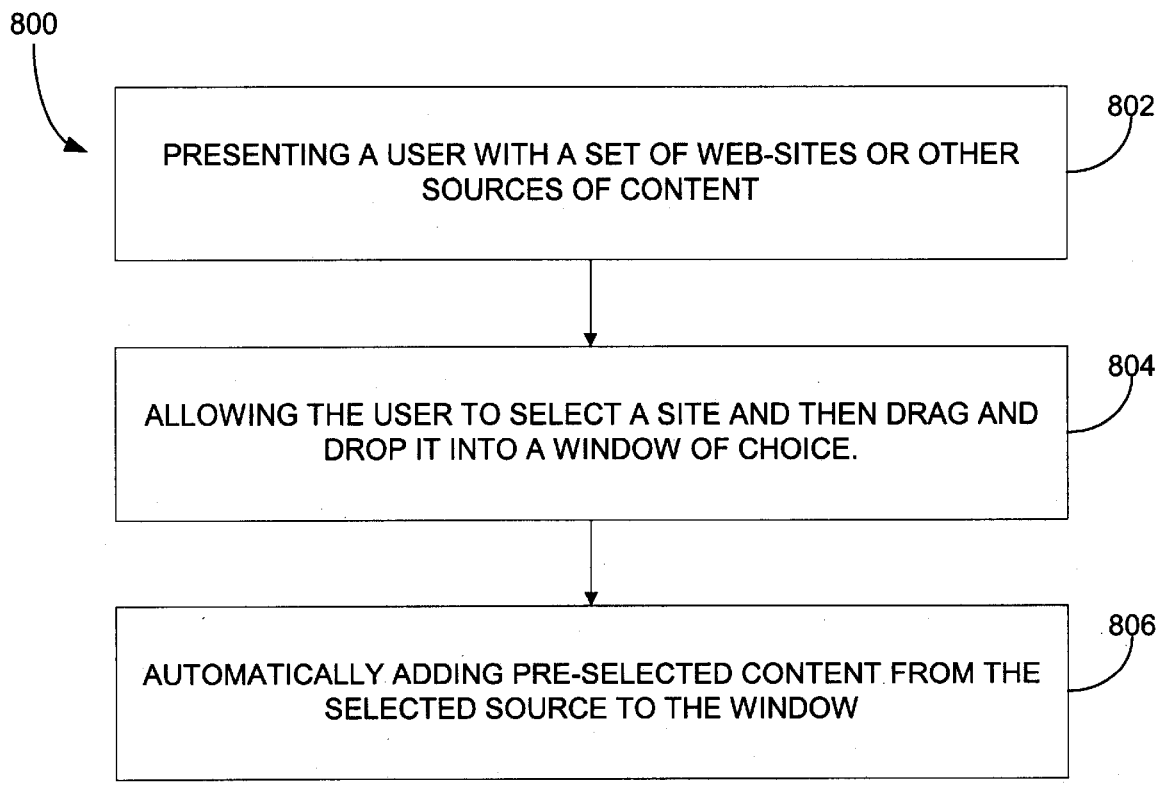
FIG. 8 depicts a default mode process for allowing selection and management of preferred content according to one embodiment of the present invention.

Referring to FIG. 8, in a default mode process 800 for allowing selection and management of preferred content according to one embodiment of the present invention, a user is presented with a set of web-sites or other sources of content in operation 802. In operation 804, the user is allowed to select a site and then drag and drop it into a window of choice. Once that is done, pre-selected content from that source is automatically added to the window in operation 806.

Figure 9:
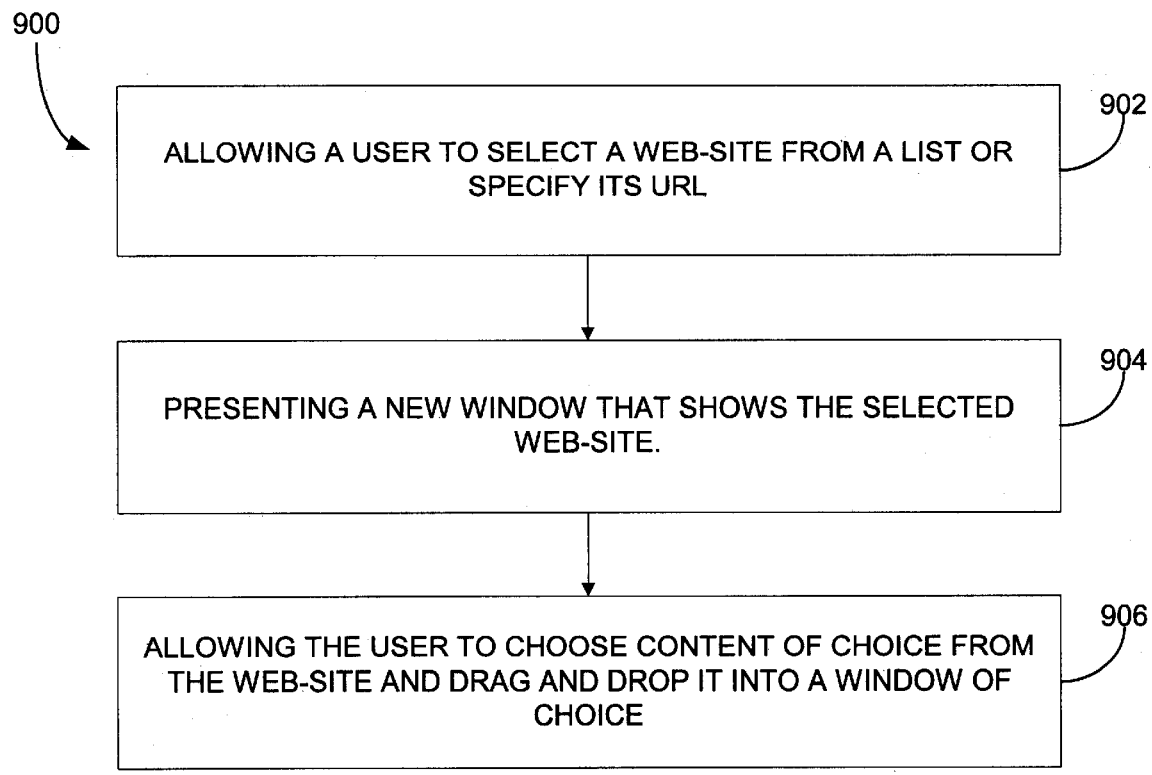
FIG. 9 is a flowchart of an advanced mode process for allowing selection and management of preferred content according to an embodiment of the present invention.

FIG. 9 is a flowchart of an advanced mode process 900 for allowing selection and management of preferred content according to an embodiment of the present invention. In operation 902, a user is allowed to select a web site from a list or specify its URL. A new window is presented in operation 904 that shows the selected web-site. In operation 906, the user is allowed to choose content of choice from the web-site and drag and drop it into a window of choice.

The Mechanism for Tagging Selected Information Contained in a Web-page

Web-pages are created using HTML (Hyper Text Markup Language). The content in a web-page is formatted using a tabular format where each table is composed of individual cells distributed into a number of rows and columns. A table may contain other tables within its individual cells. The tagging of selected information within a web-page hinges upon assigning an address to each item of content within the web-page. The addressing scheme takes into account the table(s), row(s), column(s) and cell(s) an item of content belongs to. An item of content can be identified by its address within a web-page and (ii) all the addressing schemes that take into account the table(s), row(s), column (s) and cell(s) an item of content belongs to. The addressing scheme works as follows:

The page is viewed to be composed of tables that may themselves contain other tables. The tables that are not contained in any other table (highest-level tables) are assigned identifying numbers starting from 1. Tables contained within the highest-level tables are assigned numbers that take into account the tables that contain them. If a table is not contained in any other table, then it may be assigned a number, say 3. If table number 3 contains two tables, then they will be assigned numbers 3-1 and 3-2 respectively. Each table is composed of a unique number of rows and columns. Each item of content resides within a cell that belongs to a specific row and column of a table. The complete address of an item of content is then the unique identifier of the table that contains it and the position of that item of content within that table.

Once the address of selected content is determined, it is converted into a hyperlink that contains the original content or a hyperlink to it, and its address. When a user drags and drops that selected content into a window of choice, that hyperlink and all of its associated information is sent through the window to the servers where it is entered into a database.

This mechanism also allows a capture of configurable sections of a web-page, including individual words, lines, paragraphs.

In the case of secure information like email or bank accounts, the mechanism followed is as follows:

1. First forms are created to allow a user to log into their accounts. These forms consist of (a) Dynamic information (like the user name and password) which is captured during the session (b) Static information that is required by the remote account server which is stored in a database and retrieved when an account is selected.
2. Using the dynamic and static information, the server logs into the remote server.
3. The account information is retrieved.
4. The account information is presented in a suitable and configurable format.

The Mechanism for Local Storage or Caching of Selected Content

The selected information is cached or stored locally to enable a faster access. Once a web site is selected by a user, a copy of the site, including text and images, is kept locally in the servers. When any user requests a page that has been requested before, the cached copy is presented if the content of the site has not changed since the time the page was cached. The process is broken down into two: Simple and Customized addition of content:

Addition of Default content: The addition of default content proceeds as follows:

1. Once a site is selected, the backend identifies the headlines that have been pre-selected for that site.
2. The server queries the database and picks up the default headlines.

3. The headlines that are not included in the pre-selected content are not included.
4. The server contacts the ActiveX control that constitutes the administrative page and communicates the selected headlines.
5. The selected headlines are visible in the ActiveX control and are also accessible to the main user interface.

Addition of Customized content: In the case of addition of customized content, the process is as follows:

1. The user selects a hyperlink by dragging and dropping them into the ActiveX control on the Administrative page.
2. The hyperlink and related information are sent to the servers. The information includes (a) the content of the link, (b) its location on the page, (c) the URL of the site, (d) the identity of the window and the view it has been dropped into and (e) the user name.
3. Once the link has been selected, it is added to the database and is accessible to the main user interface.

The Mechanism for Communication of Selected Information to the Backend Servers

Once a hyperlink is dropped into a window, information is passed by the window to the backend servers. This information includes the address of the hyperlink, as defined above. In addition, the information about the window and the view containing that window is also sent to the server. This information is then used by scripts to generate the front page in HTML.

The Mechanism for Regular Retrieval of Preferred Content from Selected Sites

The power of the current invention is that refreshed content is retrieved from the selected sources of information as they are updated. The sources of information, or web sites, selected by users are cached locally. The web pages stored locally are categorized according to the number of times they are requested. High request sites are retrieved once every few hours, for example.

The Mechanism to Check for a Change of Content or Format in the Selected Sources of Information Once a page has been requested by a user, it is retrieved on a regular basis. There are two checks performed to find out a change in the information in the page. The first involves a change in the content of the page and the second a change in the format in which the content is presented.

Change in a Page's Content

Every time a page is retrieved, a copy is kept locally on servers. Once a page is automatically retrieved, the content from the newly retrieved version of the page is compared to the content from a previous version of the page. If there is a change in the content, then the updated content is retrieved.

A Change in the Format of the Content

The formatting of the content in a page is stored in terms of a complete addressing scheme for the page, which specifies the breakdown of the page into its sub-sections. Once there is a change in the formatting of the page, then the relations of different sub-sections of the page to their parent sections change. A mechanism is implemented that keeps track of the number of differences between the format of a previously stored version of the page and the newly retrieved version. An alert is sent to the users if the number of differences is greater than a configurable number.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for selection and formatting of web content for remote viewing, comprising the steps of:
   (a) receiving user-defined information specifying content to be retrieved from at least one web site;
   (b) retrieving content from the at least one web site utilizing the user-defined information;
   (c) aggregating the retrieved content at a network server located remotely from the user;
   (d) formatting the aggregated content at the network server for display on multiple types of wireless devices;
   (e) identifying a type of wireless device being used by the user;
   (f) selecting aggregated content for output to the particular type of wireless device;
   (g) transmitting the formatted content to the particular type of wireless device for display on the particular type of wireless device, wherein the selected content is formatted for output on the particular type of wireless device; and
   (h) updating the retrieved content after a predetermined amount of time has expired and repeating steps (d)–(g).

2. A method as recited in claim 1, wherein the user is allowed to interact with the content via the wireless device.

3. A method as recited in claim 1, wherein the user is allowed to submit the user-defined information from at least one of the wireless device and a hardwired device.

4. A method as recited in claim 1, further comprising the step of sending an alert to the wireless device upon occurrence of a prespecified condition.

5. A computer program embodied on a computer readable medium for selection and formatting of web content for remote viewing, comprising:
   (a) a code segment that receives user-defined information specifying content to be retrieved from at least one web site;
   (b) a code segment that retrieves content from the at least one web site utilizing the user-defined information;
   (c) a code segment that aggregates the retrieved content at a network server located remotely from the user;
   (d) a code segment that formats the aggregated content at the network server for display on multiple types of wireless devices;
   (e) a code segment that identifies a type of wireless device being used by the user;
   (f) a code segment that selects aggregated content for output to the particular type of wireless device;
   (g) a code segment that transmits the formatted content to the particular type of wireless device for display on the particular type of wireless device, wherein the selected content is formatted for output on the particular type of wireless device; and
   (h) a code segment that updates the retrieved content after a predetermined amount of time has expired, formats the aggregated content at the network server for display on a wireless device, and transmits the formatted content to the wireless device for display on the wireless device.

6. A computer program as recited in claim 5, wherein the user is allowed to interact with the content via the wireless device.

7. A computer program as recited in claim 5, wherein the user is allowed to submit the user-defined information from at least one of the wireless device and a hardwired device.

8. A computer program as recited in claim 5, further comprising a code segment that sends an alert to the wireless device upon occurrence of a prespecified condition.

9. A system for selection and formatting of web content for remote viewing, comprising:
   (a) logic that receives user-defined information specifying content to be retrieved from at least one web site;
   (b) logic that retrieves content from the at least one web site utilizing the user-defined information;
   (c) logic that aggregates the retrieved content at a network server located remotely from the user;
   (d) logic that formats the aggregated content at the network server for display on multiple types of wireless devices;
   (e) logic that identifies a type of wireless device being used by the user;
   (f) logic that selects aggregated content for output to the particular type of wireless device;
   (g) logic that transmits the formatted content to the particular type of wireless device for display on the particular type of wireless device, wherein the selected content is formatted for output on the particular type of wireless device; and
   (h) logic that updates the retrieved content after a predetermined amount of time has expired, formats the aggregated content at the network server for display on a wireless device, and transmits the formatted content to the wireless device for display on the wireless device.

10. A system as recited in claim 9, wherein the user is allowed to interact with the content via the wireless device.

11. A system as recited in claim 9, wherein the user is allowed to submit the user-defined information from at least one of the wireless device and a hardwired device.

12. A system as recited in claim 9, further comprising logic that sends an alert to the wireless device upon occurrence of a prespecified condition.

13. A method for selection and formatting of web content for remote viewing, comprising:
   (a) receiving user-defined information from at least one of a wireless device and a hardwired device;
   (b) wherein the user-defined information specifies content to be retrieved from at least one web site;
   (c) wherein the user-defined information being received in real time;
   (d) wherein the user-defined information includes a general request for content;
   (e) wherein a search engine is used to retrieve content from the at least one web site based on the user-defined information;
   (f) retrieving content from the at least one web site utilizing the user-defined information;
   (g) wherein the content includes at least one of: text, secure account information, services, and financial transactions;
   (h) aggregating the retrieved content on a portal page unique to the user at a network server located remotely from the user;
   (i) formatting the aggregated content at the network server for display on multiple types of wireless devices;
   (j) wherein the wireless device sends a request for content in a particular type of formatting;

(k) wherein a type of the wireless device being used by the user is identified based on the request;

(l) wherein the wireless device is at least one of a personal digital assistant (PDA), a handheld computer, a wireless telephone, a device connected to a wireless modem, and a pager;

(m) selecting aggregated content for output to the particular type of wireless device;

(n) transmitting the formatted content to the particular type of wireless device for display on the particular type of wireless device, wherein the selected content is formatted for output on the particular type of wireless device;

(o) updating the retrieved content after a predetermined amount of time has expired;

(p) wherein the user is allowed to interact with the content via the wireless device; and (q) sending an alert to the wireless device upon occurrence of a prespecified condition;

(r) wherein the user is allowed to specify whether a particular web page is retrieved upon detection that the web page has changed;

(s) wherein a transmission cost and reliability are customizable;

(t) wherein a transmission time is customizable;

(u) wherein a formatting style of the content is specific to the wireless device used by the particular user.

14. A method as recited in claim 1, wherein the user-defined information is received from the wireless device, wherein the user-defined information includes a general request for content, wherein a search engine is used to retrieve content from the at least one web site based on the user-defined information.

15. A method as recited in claim 1, wherein the user is allowed to specify whether a particular web page is retrieved upon detection that the web page has changed.

16. A method as recited in claim 1, wherein the wireless device sends a request for content in a particular type of formatting.

17. A method as recited in claim 1, wherein a wireless transmission cost and reliability are customizable.

18. A method as recited in claim 1, wherein a wireless transmission time is customizable.

19. A method as recited in claim 1, wherein a formatting style of the content is specific to the wireless device used by a particular user.

20. A method as recited in claim 1, wherein the wireless device is at least one of a personal digital assistant (PDA), a handheld computer, a wireless telephone, a device connected to a wireless modem, and a pager.

* * * * *